Dec. 29, 1964  A. L. TUNICK  3,163,344

CONTAINER

Filed Feb. 18, 1963

INVENTOR.
Abraham L. Tunick
BY
Gary, Desmond & Parker
Att'ys

United States Patent Office 3,163,344
Patented Dec. 29, 1964

3,163,344
CONTAINER
Abraham L. Tunick, Rock Island, Ill., assignor to Chicken Delight, Inc., Rock Island, Ill., a corporation of Illinois
Filed Feb. 18, 1963, Ser. No. 259,279
1 Claim. (Cl. 229—16)

The present invention relates to containers, and more particularly to foldable paper board and like boxes for articles or products requiring ventilation.

For purposes of exemplifying the field of application of the present invention, reference will be made herein to containers for the cooked, ready-to-eat food products of carry-out restaurants, such as pizzerias. It will be understood, of course, that this is but one example of the usefulness of the invention, and that the invention is generally applicable to the packaging of articles or products requiring ventilation.

Many food products such as pizza are prepared and cooked in restaurants for delivery to the customer's home, or to be picked up by the customer, in a hot, ready-to-eat condition. For sanitary reasons, to preserve the appearance of the food, and to maintain the same hot, it is desirable to pack the cooked food in a box for delivery to the customer. However, many products lose desirable eating qualities if enclosed in a box. For example, the tender crispy crust which typifies good pizza becomes soggy when enclosed hot in a box, thereby decreasing the customer's enjoyment and possibly causing the restaurant to acquire a poor reputation.

According to the present invention, the disadvantage above described is obviated by providing vent holes in the box to release steam emanating from the hot pizza, the vents being of relatively limited area to eliminate the cause of the disadvantageous effect without creating problems of excessive cooling or container instability that would be equally objectionable to the customer. However, the provision simply of vent holes would not resolve the problem entirely since it is conventional to stack boxes side-by-side and on top of one another, so that vent holes would normally be blocked off by adjacent boxes and fail to accomplish their intended purpose.

The object of the present invention, generally stated, is to provide an improved container including both vent openings and means for spacing the vented portions of the container from other containers whereby the vent openings cannot be blocked off despite stacking of other containers on top of and around the one container. This is accomplished by provision of projecting tabs adjacent the vent openings spacing the vented portions of the container from adjacent containers whereby each container or box is continually vented.

Specifically, it is the object of the present invention to provide an improved ventilated container wherein both the vent openings and the projecting spacer tabs are formed in an exceptionally economical and expeditious manner by simple die cuts in one wall of the container blank.

In keeping with the foregoing, an object of the present invention is to provide in a container having a pair of adjacently disposed relatively foldable angularly related integral walls the improvement comprising a generally U-shaped cut in one of the walls adjacent the margin of the other wall, said cut at its ends terminating adjacent the margin of said other wall, said cut upon relative folding of the two walls forming a vent hole in said one wall and a tab integral with said other wall projecting beyond said one wall for spacing said one wall from adjacent containers, whereby the vent hole is maintained continually open.

A further object of the invention is the provision of a container blank defining a container top wall and relatively foldable side walls integral with the top wall, characterized by a plurality of spaced generally U-shaped cuts in the top wall along the margin of each side wall, said cuts at their ends terminating adjacent the margin of the respective side wall, said cuts thereby defining tabs integral with the side walls, and aligned fold lines between said tabs along the margin of each side wall, said tabs upon folding of the side walls along said fold lines swinging upwardly above the top wall and opening up a vent hole in the top wall adjacent each of said tabs.

Other objects and advantages of the invention will become apparent in the following detailed description.

Now, in order to acquaint those skilled in the art with the manner of making and using the improved container of the present invention, there shall be described, in connection with the accompanying drawings, a preferred embodiment of the improved container and the preferred manners of making and using the same.

Figure 1:
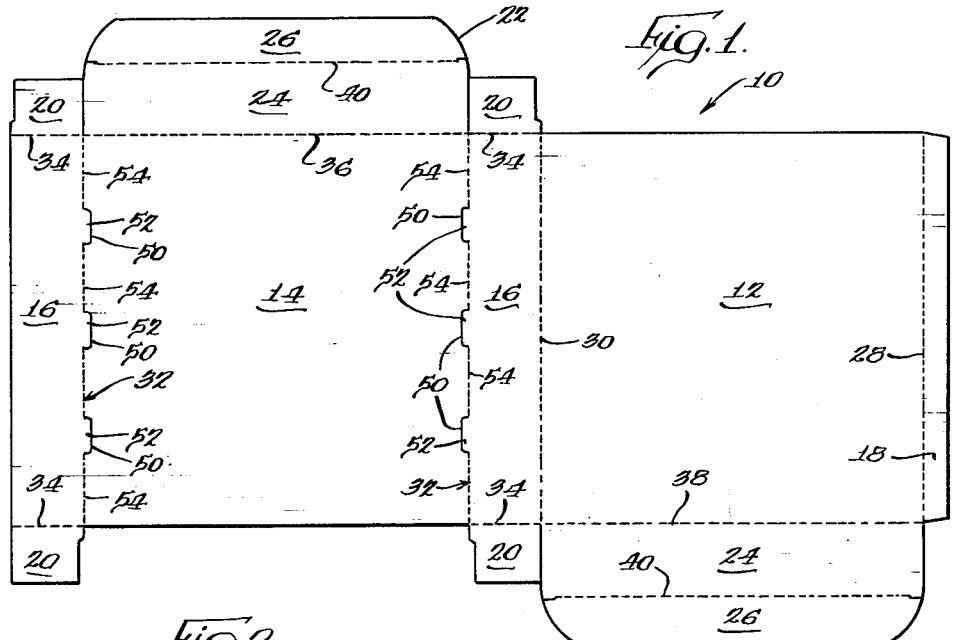
FIGURE 1 is a plan view of a container blank made in accordance with the present invention.

Referring now to FIGURE 1, the reference numeral 10 indicates an integral or one-piece container blank formed of paper board or any other rigid or semirigid material customarily employed in the folding box art. As is well known, the box material is cut and scored to facilitate folding of the blank into a box or container. In the blank illustrated, the cut (solid) lines and the score (dotted) lines define a bottom wall 12, a spaced parallel top wall 14, a pair of side walls 16, one disposed between adjacent margins of the top and bottom walls and the other at the opposite margin of the top wall, a side margin gluing tab 18 at the opposite margin of the bottom wall, side fold end tabs 20 projecting from each end of each side wall 16, and a pair of end closures 22 disposed respectively at one end of the bottom wall and the opposite end of the top wall. Each end closure 22 is suitably of the well-known tuck-in type including an end closing wall 24 and a tuck flap 26.

The various box sections or parts above described are preferably separated from one another by score or fold lines, namely, a straight fold line 28 between the bottom 12 and the gluing tab 18, a straight fold line 30 between the bottom 12 and the adjacent side wall 16, special fold and cut line means 32 between the top 14 and both of the side walls 16, end tab fold lines 34, a straight fold line 36 between the top and the adjacent end wall 24, a straight fold line 38 between the bottom and the end wall 24 adjacent thereto, and straight fold lines 40 between each end wall 24 and the adjacent tuck flap 26.

As is known to those skilled in the art, the illustrated blank is adapted to be folded on lines 28, 30 and 32 to form an open-end envelope, whereupon the surface of the tab 18 revealed in FIGURE 1 may be glued to the opposite surface of the free (left-hand) side wall 16 to fix the parts in envelope form. In this condition, the walls 12, 14, 16 and 18 are free to fold about either pair of diagonally opposite corners of the envelope as illustrated in FIGURE 2, whereby the envelope may be folded flat for storage in a nominal space until it is to be used.

Figure 2:
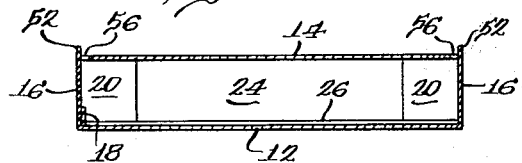
FIGURE 2 is a vertical cross-section of the container resulting from the blank.

When it is desired to use a box, the envelope is unfolded to open condition, i.e., with the side walls 16 upright and the top and bottom walls in spaced parallel horizontal position as shown in FIGURE 2. The side fold end tabs 20 at one end of the envelope are then folded inwardly, the respective end wall 24 is folded over the tabs, and the respective flap 26 is tucked into the box, thereby to close the one end of the box and maintain the box in upright or set-up condition. After a product has been inserted through the open opposite end of the box, said opposite end may be closed in the same manner as above described for the one end, thereby to complete the box set-up.

The blank and box as thus far described are (except for the special line means 32) well-known in the art and have been selected for illustration herein as representative of a practical and economical container for pizzas to which the present invention may be applied. It is to be understood that the blank and box are simply one example of boxes to which the present invention is applicable. The important feature is that there be at least a pair of adjacent, relatively foldable, integral walls, such as the top wall 14 and each of the side walls 16.

According to the present invention, as applied to the illustrated box and blank, the top wall 14 is provided along the adjacent margin of each side wall 16 with a plurality of spaced generally U-shaped cuts 50, the ends of each of which terminate substantially at or on the adjacent margin of the respective side wall. Each cut 50 thereby forms from the material of the top wall a spacer tab 52 integral with the adjacent side wall. To maintain the integrity of the tabs 52 and the respective side walls 16, the tabs are not scored. However, to facilitate relative folding of the top and side walls, the blank is preferably scored along the margin of each side wall in the spaces between the tabs 52, as indicated at 54. The fold lines 54 and the cuts 50 together comprise the fold line means 32 previously referred to.

Figure 4:
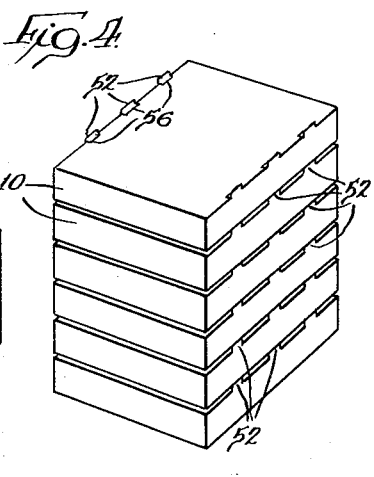
FIGURE 4 is a perspective view of a plurality of the containers superimposed on one another and illustrating the spacing between containers attained by virtue of the invention.
Figure 3:
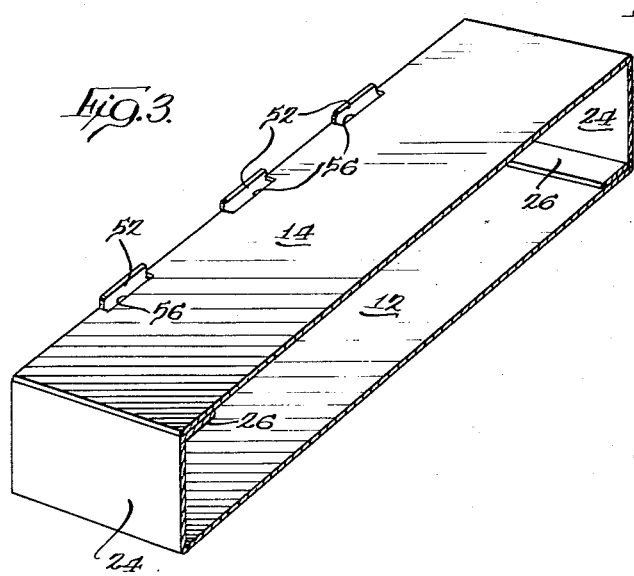
FIGURE 3 is a fragmentary perspective view of one side of the container particularly showing the vent holes and spacer tabs provided in accordance with the present invention.

Upon setting-up of the blank to form the box illustrated in FIGURE 2, the tabs 52 being integral with the side walls 16 move into upright position when the walls 16 are folded relative to the top wall 14. Simultaneously, the tabs 52 in moving out of the material of the top wall open up a vent hole or slot 56 in the top wall immediately inwardly of each tab, as shown in FIGURES 2 and 3. Each vent opening 56, being immediately adjacent a tab 52, is thus protected by the respective tab from being closed off from above and/or from the side. For example, as illustrated in FIGURE 4, a plurality of the boxes may be superimposed on one another, in which position the tabs 52 space the boxes apart to provide a vent space therebetween with which the vent openings 56 communicate, whereby the interior of each box is vented to atmosphere. The same situation will prevail even if the boxes are randomly stacked on top of or alongside of one another. By providing three relatively narrow tabs 52 on each side of the top wall 14 in the embodiment of the invention illustrated and described, adequate venting of pizzas packaged one to a container is continually provided, thereby to assure delivery to customers of hot, crispy pizzas having the desired eating quality.

The invention, of course, is not limited to pizza containers. The cuts 50, and thus the tabs 52 and vents 56, may be of any size, number, shape or location desired for any particular purpose. They may be longer or smaller or more or less in number than herein illustrated, and may be provided in top, bottom, side and/or end walls. The important factor is that the cuts be provided in one of two adjacent relatively foldable integral walls with the ends of the cuts merging into the other wall, whereby to form tabs integrally movable with said other wall to define spacer tabs and adjacent vent openings.

In view of the foregoing, it is submitted that all of the objects and advantages of the invention have been shown herein to be attained in a convenient, economical and practical manner.

While a preferred embodiment of the invention has been selected for description and illustration herein, it is to be appreciated that various changes, rearrangements and modifications may be made therein without departing from the scope of the invention, as defined by the appended claim.

What is claimed is:

A ventilated stackable container for freshly cooked, ready-to-eat, carry-out foods such as pizza, comprising a unitary sheet of container material cut and folded to define spaced parallel top and bottom walls of the same size, spaced parallel side walls of the same size as each other and the same length as the top and bottom walls, spaced parallel opposite end walls of the same width as the top and bottom walls and the same height as said side walls, spacer tabs projecting upwardly from the side walls above the top wall, and vent openings in the top wall adjacent said tabs; said sheet including said bottom wall, a glue tab adjoining one side of said bottom wall, a first one of said side walls adjoining at one of its sides the opposite side of the bottom wall, continuous fold lines between said bottom wall and each of said glue tab and said first side wall integrally hinging the tab and side wall to the bottom wall, said top wall adjoining at one side the opposite side of said first side wall, the second one of said side walls adjoining the opposite side of said top wall, a plurality of spaced parallel U-shaped cuts in the top wall along the adjacent side of each of said side walls, said cuts at their ends terminating adjacent the side of the respective side wall, aligned fold lines between but not within the area defined by said cuts along the adjoining sides of said top wall and each of said side walls, said cuts and fold lines forming said vent openings in the top wall and said upwardly projecting spacer tabs integrated with said side walls upon relative folding of said side walls and said top wall along the latter fold lines, said top, bottom and side walls and said glue tab being foldable into tubular envelope form along said fold lines and being retained in such form by gluing the glue tab to said second side wall, a side fold end tab adjoining and integrally hinged by a fold line to each end of each of said side walls, said end walls respectively adjoining and being integrally hinged by a fold line to opposite ends of said top and bottom walls, and a tuck flap adjoining and integrally hinged by a fold line to each of said end walls, said side fold end tabs being foldable toward the interior of said envelope, said end walls being foldable over said side fold end tabs and said tuck flaps being insertable into said envelope to complete the container.

References Cited in the file of this patent
UNITED STATES PATENTS

| | | |
|---|---|---|
| 621,983 | Wade | Mar. 28, 1899 |
| 1,101,479 | Van Osdel | June 23, 1914 |
| 2,704,180 | Goebel | Mar. 15, 1955 |
| 2,721,689 | Nye | Oct. 25, 1955 |
| 3,059,830 | Kramer | Oct. 23, 1962 |